US006764304B2

(12) United States Patent
Atreya

(10) Patent No.: US 6,764,304 B2
(45) Date of Patent: Jul. 20, 2004

(54) FURNACE HAVING INCREASED ENERGY EFFICIENCY AND REDUCED POLLUTANT FORMATION

(75) Inventor: Arvind Atreya, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/286,224

(22) Filed: Oct. 31, 2002

(65) Prior Publication Data

US 2003/0079665 A1 May 1, 2003

Related U.S. Application Data

(60) Provisional application No. 60/336,539, filed on Nov. 1, 2001.

(51) Int. Cl.[7] .............................. F27D 13/00; F23B 1/12
(52) U.S. Cl. ............................ 432/5; 110/208; 110/295
(58) Field of Search .............................. 432/121, 175, 432/176, 9, 5; 110/124, 208, 295, 218, 224

(56) References Cited

U.S. PATENT DOCUMENTS

| | | | | |
|---|---|---|---|---|
| 2,543,708 A | * | 2/1951 | Rice et al. ..................... | 266/5 |
| 4,761,132 A | * | 8/1988 | Khinkis ........................ | 431/10 |
| 4,878,839 A | * | 11/1989 | Wunning ...................... | 432/72 |
| 4,883,003 A | * | 11/1989 | Hoskinson ................... | 110/212 |
| 5,154,599 A | * | 10/1992 | Wunning ..................... | 431/215 |
| 5,645,412 A | * | 7/1997 | Besik .......................... | 431/115 |
| 6,193,940 B1 | * | 2/2001 | Kang et al. .................. | 422/198 |

OTHER PUBLICATIONS

Everest, D. and Atreya, A., "Lessons Learned from Industrial Assessments of Metal Casting Facilities," 2001 ACEEE Conference on Energy Efficiency in Industry, Jul., 2001, 12 pages.

Atreya, A., Zhang, C., Kim, H.K., Shamim, T. and Suh, J., "The Effect of Changes in the Flame Structure on Formation and Destruction of Soot and $NO_x$ in Radiating Diffusion Flames," Twenty–Sixth (International) Symposium on Combustion, 1996, pp. 2181–2189.

Mungekar, H., Atreya, A., "Soot Formation in Partially Premixed Flamelets," Paper No. NHTC2000–12316, Proceedings of the 34th National Heat Transfer Conference, Aug. 20–22, 2000, 9 pages.

Mungekar, H., Atreya, A., "Flame Radiation and NO Emission in Partially Premixed Flames," Proceedings of the 2nd Joint Meeting of the US Sections of the Combustion Institute, 2001, 24 pages.

Mungekar, H., Atreya, A., "Control of Soot Luminosity and Soot Emission in Counter–Flow Flames by Partial Premixing," Paper No. NHTC01–14023, Proceedings of the 35th National Heat Transfer Conference, Jun. 10–12, 2001, 8 pages.

Katsuki, M., and Hasegawa, T., "The Science and Technology of Combustion in Highly Preheated Air," 27th Symposium (International) on Combustion/The Combustion Institute, 1998, pp. 3135–3146.

(List continued on next page.)

Primary Examiner—Kenneth B. Rinehart
(74) Attorney, Agent, or Firm—Harness, Dickey & Pierce, P.L.C.

(57) ABSTRACT

A furnace design that combines the benefits of oxygen enriched combustion, intense flame radiation, highly preheated combustion air, exhaust gas recirculation, buoyancy driven flows and $NO_x$ reburn chemistry in a single unit to significantly reduce energy consumption and pollutant formation. The furnace also allows burning low calorie fuels and fuels of different types. It substantially increases the level of radiation heat transfer and its uniformity, thereby enhancing furnace productivity and provides an oxygen free atmosphere to prevent oxidation of materials being heated.

40 Claims, 2 Drawing Sheets

Wunning, J.A., and Wunning, J.G., "Flameless Oxidation to Reduce Thermal NO–Formation," Prog. Energy Combust. Sci, 1997, vol. 23, pp. 81–94.

Pinder, T., and Atreya, A., "Experimental and Computational Investigation of Dynamic Control Strategies For Nonpremixed Flames," Proceedings of the 3rd Joint Meeting of the U.S. Sections of The Combustion Institute, 6 pages.

Berhan, S., Atreya, A., and Everest, D., "Radiant Extinction of Gaseous Diffusion Flames," Proceedings of the 6th International NASA Microgravity Combustion Workshop, 2001, 5 pages.

Kelly, S., Wooldridge, M., and Atreya, A., "An Experimental Study of Emission From Counterflow Diffusion Flames for Application to Combustion Control," NHTC01–11422, Proceedings of the 35th National Heat Transfer Conference, Anaheim,CA, Jun. 10–12, 2001, 8 pages.

"Roadmap for Process Heating Technology," Priority Research & Development Goals and Near–Term Non–Research Goals to Improve Industrial Process Heating, U.S. Department of Energy Office of Industrial Technologies, Draft Mar. 16, 2001, 49 pages.

"High–Temperature Furnaces—Stretch Fuel Dollars and Shrink Emissions," Natural Gas Applications in Business and Industry, Aug., 2001, 3 pages.

Interlaboratory Working Group on Energy–Efficient and Clean Energy Technologies, "Scenarios for a Clean Energy Future," Nov., 2000, 12 pages.

Gupta, A., "Flame Characteristics and Challenges With High Temperature Air Combustion," Proceedings of the 2nd International Seminar on High Temperature Combustion in Industrial Furnaces, ISBN 83–912395–4–3, Stockholm Sweden, Jan. 17–18, 2000, 18 pages.

Hasegawa, T., Kishimoto, S., and Suzukawa, Y., "Environmentally–compatible Regenerative Combustion Heating System," Proceedings of the 2nd International Seminar on High Temperature Combustion Industrial Furnaces, ISBN 83–912395–4–3, Stockholm Sweden, Jan. 17–18, 2000, 8 pages.

Weber, R., Verlaan, A., Orsino, S., and N. Lallemant, "On Emerging Furnace Design Methodology That Provides Substantial Energy Savings and Drastic Reductions in $CO_2$' CO and $NO_x$ Emissions," Proceedings of the 2nd International Seminar on High Temperature Combustion in Industrial Furnaces, ISBN 83–912395–4–3, Stockholm Sweden, Jan. 17–18, 2000, 7 pages.

Uede, M., Imada, M., Murakami, K., and Akiyama, T., "The Developing Technology for The Highly Preheated Air Combustion in The Project and Its Application to Real Furnaces," Proceedings of the 2nd International Seminar on High Temperature Combustion in Industrial Furnaces, ISBN 83–912395–4–3, Stockholm Sweden, Jan. 17–18, 2000, 11 pages.

Flamme, M., "New Opportunities for Improvement of Energy Efficiency in Process Technology," Proceedings of the 2nd International Seminar on High Temperature Combustion in Industrial Furnaces, ISBN 83–912395–4–3, Stockholm Sweden, Jan. 17–18, 2000, 16 pages.

* cited by examiner

FURNACE HAVING INCREASED ENERGY EFFICIENCY AND REDUCED POLLUTANT FORMATION

CROSS-REFERENCE TO RELATED APPLICATIONS

This application claims the benefit of U.S. Provisional Application No. 60/336,539, filed on Nov. 1, 2001. The disclosure of the above application is incorporated herein by reference.

FIELD OF THE INVENTION

The present invention generally relates to furnaces and, more particularly, relates to high temperature furnaces having improved energy efficiency and pollutant prevention capabilities.

BACKGROUND AND SUMMARY OF THE INVENTION

According to a recent DOE Interlaboratory Working Group Report, in 1997, the U.S. industrial sector consumed approximately 35 quads of primary energy resulting in about 494 MtC of carbon emissions. More than half of this energy was used as production process heat by energy-intensive industries like steel, metal casting, aluminum, chemicals, paper, and glass. However, only approximately 60% of this energy is used/usable and, thus, approximately 40% is lost through inefficiencies. This significant amount of lost energy costs approximately $21 billion. Moreover, a byproduct of this energy usage is the corresponding $CO_2$ emissions that contribute to global warming.

In order to reduce fuel expenses and $CO_2$ emissions, it is important to increase the furnace efficiencies. Such efficiency improvements can be achieved by better insulation (reducing conductive, convective, and radiative losses) and by reducing stack losses. The present invention is capable of reducing stack losses, which is a major contributor to these losses.

Accordingly, the wasted flue gas enthalpy will be used to preheat the incoming oxygen-enriched combustion air and fuel. Typically, this method is not employed because both preheating and oxygen-enrichment increase $NO_X$ production and contributes to heat flux non-uniformities within the furnace because of higher flame temperatures. A novel solution to this problem is addressed by the present invention. That is, the present invention utilizes nearly homogeneous burning and increases the flame radiation. Therefore, near unity flame emissivity at an average temperature of 1700K, with peak temperatures not exceeding 1800K, is accomplished. Thus, the present invention provides nearly uniform radiation heat transfer to the objects in the furnace at a magnitude exceeding 400 kW/m$^2$, while maintaining strict constraints on $NO_X$, CO, unburned hydrocarbons (UHC) and particulate emissions. The level of heat flux attained is nearly twice the current maximum, thereby enabling an increase in the furnace productivity or a decrease in size and cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. For example, this invention could be used to increase the efficiency of water-tube boilers or a multiple zone furnace can be designed based on the concepts outline herein.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. The present invention arises from the need for energy efficiency and pollutant prevention in industries that utilize high temperature furnaces, such as the aluminum, glass, metal casting, and steel industries. Therefore, it should be appreciated that the present invention may find utility in water-tube boilers used for power plant steam generation, which currently rely on inefficient technology. Until now, conventional furnaces were unable to combine all the advantages of the present invention into a single unit.

Figure 1:
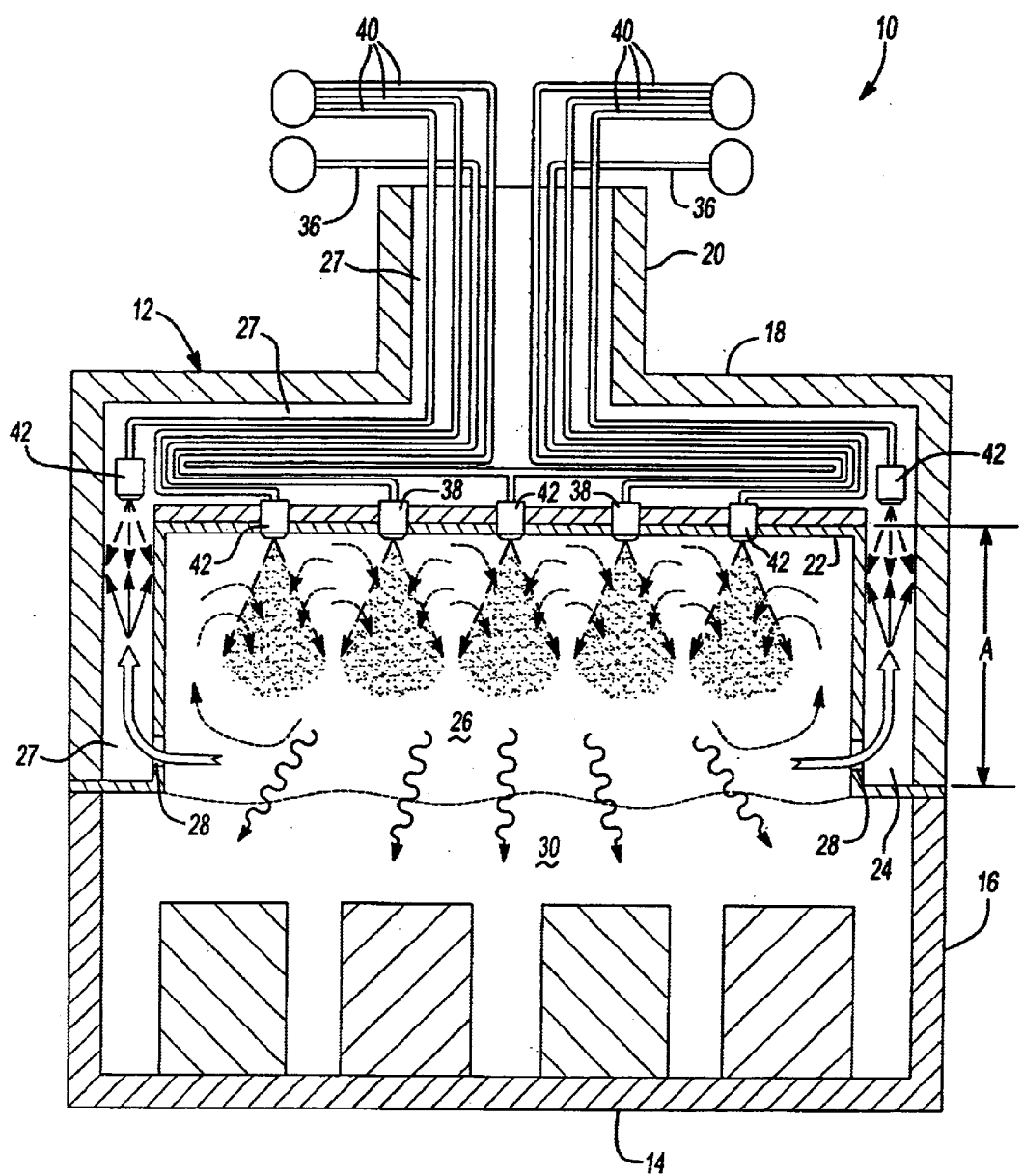
FIG. 1 is a schematic view illustrating a furnace according to a first embodiment of the present invention.

Referring now to FIG. 1, a schematic diagram of a furnace 10 according to a first embodiment of the present invention is provided. As will be described in detail, furnace 10 combines the benefits of oxygen-enriched combustion, intense flame radiation, highly preheated combustion air, exhaust gas recirculation, buoyancy driven flows, and $NO_x$ reburn chemistry in a single furnace, which significantly reduces energy consumption and the formation of pollutants. Furnace 10 is capable of burning low calorie fuels and fuels of different types, such as propane, natural gas, and the like. It can also burn them in pure oxygen to provide a wide range of applications. Furthermore, furnace 10 substantially increases the level and uniformity of radiation heat transfer, thereby enhancing furnace productivity to a level not available in the prior art. Still further, furnace 10 provides an oxygen-free atmosphere to prevent oxidation of the materials being heated, which is particularly useful in the heating/melting of metals in general and aluminum and titanium in particular. In these situations, the oxygen present in conventional heating furnaces causes substantial loss in the amount of useable material, since at least a top portion of the material oxidizes during the heating process.

With particular reference to FIG. 1, furnace 10 generally comprises a furnace housing 12 defining a bottom section 14, a side wall(s) 16, and a top section 18. Bottom section 14, sidewall 16, and top section 18 are preferably insulated according to known techniques. Furnace housing 12 further includes an exhaust stack 20 preferably extending from top section 18 to allow the exhausting of combusted materials. An internal ceiling member 22 is disposed within furnace housing 12 generally parallel to and offset from top section 18. Co-annular exhaust ducts 24 are disposed along and offset from sidewall 16 of furnace housing 12 to define an exhaust passage 27 extending from a reaction zone 26 to exhaust stack 20. More specifically, co-annular exhaust ducts 24 have at least one exhaust port 28 formed therein to provide fluid communication between reaction zone 26 and exhaust passage 27. Exhaust passage 27 extends through co-annular exhaust ducts 24, between internal ceiling member 22 and top section 18, and out exhaust stack 20. Ideally, exhaust port 28 is disposed at a predetermined position along co-annular exhaust ducts 24 to establish the layer depth of reaction zone 26. That is, as can be seen in FIG. 1, the positioning of exhaust port 28 at a position generally below internal ceiling member 22 defines a combustion layer depth "A" generally equal to the distance between internal ceiling member 22 and exhaust port 28. The exact thickness of the combustion layer is dependent upon the furnace design and thus is best determined as the time of the final design. It should be noted that the layer depth "A" can be made adjustable by changing the location of the exhaust port 28. This provides adjustments during furnace operation under different conditions. Furnace 10 further includes a melting zone 30 generally positioned below reaction zone 26. Melting zone 30 receives the material to be heated, such as in this case aluminum, iron, glass, or other metals or materials commonly heated in furnaces. The melting zone 30 may be replaced by water tubes for the furnace to function as a water-tube boiler.

In accordance with the present invention, combustion air (or other desired oxidants such as oxygen-enriched air) and fuel are distributed to reaction zone 26 separately so as to eliminate localized high temperature regions. In conventional furnaces, the combustion air and fuel are injected into the combustion chamber in a coannular fashion. This conventional method leads to regions of high temperature in the flame brush created by the burner because fuel and air mix and immediately combusts. As is known in the art, these high heat regions lead to the formation of $NO_x$. Therefore, in the present invention, as the combustion air, fuel, and existing combustion products mix in reaction zone 26, they become highly diluted resulting in nearly homogeneous burning. Further, since the amount of fuel injected is slightly more than that required stoichiometrically, combustion is rich producing some soot and unburned hydrocarbons (that are burned later in the exhaust). Also, due to oxygen enrichment, the amount of nitrogen is reduced and large concentrations of radiative gases ($CO_2$ and $H_2O$) are present in the furnace atmosphere. The upshot is that the flame radiation is significantly enhanced reducing flame temperatures (and $NO_x$) and increasing furnace productivity. A detailed discussion of these aspects is provided below.

To this end, a plurality of fuel distribution lines 36 are provided that extend within exhaust stack 20 and each terminate at a fuel nozzle 38. Similarly, a plurality of air distribution lines 40 are provided that extend within exhaust stack 20 and each terminate at an air nozzle 42. Preferably, fuel nozzles 38 and air nozzles 42 are strategically mounted within housing 12 and, more preferably, to internal ceiling member 22 and are directed such that they entrain buoyantly-recirculated, existing combustion products within reaction zone 26. Therefore, because of the separate injection of fuel and combustion air into reaction zone 26, the fuel and combustion air are required to first mix with the existing combustion products already present within reaction zone 26 prior to combustion. This mixing, which occurs generally over entire reaction zone 26, produces a more uniform and homogenous mixture, which prevents the aforementioned localized high temperature regions. Burning then occurs in the generally homogeneously mixed reaction zone 26, providing intense and uniform radiation because of high concentration and temperature of the combustion products.

Meanwhile, buoyancy-induced circulation within reaction zone 26 aids in transporting hot existing combustion products toward internal ceiling member 22 where these hot combustion products mix with fresh incoming jets of fuel and oxygen-enriched combustion air from fuel nozzles 38 and air nozzles 42, respectively. This mixing increases the residence time of the existing combustion products to enable radiative cooling. The slightly rich combustion products eventually spill through exhaust port 28 and into co-annular exhaust duct 24, where a second stage combustion air injection completes the combustion. Air distribution lines 40 and air nozzles 42 extend within co-annular exhaust ducts 24 to provide this second stage of combustion air injection to promote complete combustion of the slightly rich combustion products, reduce $NO_x$, preheat the incoming combustion air and fuel, and further enhance flame radiation by promoting soot formation in the furnace.

As stated above, high concentrations and temperature of the combustion products—primarily $CO_2$, $H_2O$, and soot—in reaction zone 26 significantly enhance the flame radiation. Enhancing flame radiation reduces the peak flame temperatures and, hence, $NO_x$ production ($NO_x$ production is reduced still further due to $NO_x$ reburning in the fuel-rich furnace atmosphere) with an added advantage that it substantially increases the furnace productivity due to higher heat flux levels. Specifically, the heat flux is emitted directly by the high temperature gases rather than by the furnace walls, which are typically convectively heated by the hot gases.

The positioning of the plurality of fuel distribution lines 36 and the plurality of air distribution lines 40 within exhaust passage 27 serves to preheat the combustion air and fuel prior to being injected into reaction zone 26. As is well known, capturing exhaust gas enthalpy to preheat incoming combustion air and fuel increases furnace efficiency. Currently, two methods—namely, regenerative and recuperative—have been used to preheat combustion air and fuel. Although the present application describes the recuperative method of preheating oxygen-enriched combustion air and fuel, a regenerative method of combustion air preheating may be easily implemented. In fact, regenerative preheating is capable of achieving higher temperatures than recuperative preheating. However, improved recuperative designs can overcome this deficiency and, thus, reduce maintenance costs of regenerative preheating. Furthermore, recuperative preheating should be used for fuel for improved safety. It should be appreciated that although the plurality of fuel distribution lines 36 and the plurality of air distribution lines 40 are illustrated and described as being placed within exhaust passage 27, alternative designs are available—for example, conventional heat exchangers may be used to aid in the preheating of the combustion air and fuel. Therefore, the present invention is not to be regarded as being limited by the disclosure of the presently preferred embodiment.

Preheating the fuel also assists in soot formation, which is controlled by controlling the fuel flow rate. Thereafter, the soot may burn along with the fuel, which still further increases the flame radiation. Fuel preheating also enables burning liquid fuels in the same configuration with minor modifications. That is, the liquid fuels are vaporized in the fuel ducts prior to burning. However, depending on the fuel, the fuel ducts may have to be periodically cleaned to eliminate carbon deposits. This can be easily accomplished by circulating pure oxygen in the hot fuel duct to burnout the carbon deposits.

Oxygen-enriched combustion air reduces the total mass flow rate of the exhaust gases and hence further increases the furnace efficiency by reducing the total exhaust gas enthalpy. Oxygen-enriched combustion air increases the concentration of radiative gases ($CO_2$ and $H_2O$), thereby increasing the flame radiation. It will be understood to those skilled in the art that oxygen-enriched combustion air is typically not used in conjunction with capturing exhaust gas enthalpy (i.e. use exhaust gases for preheating) because $NO_x$ production typically increases. However, in the present invention, oxygen-enriched combustion air and the capturing of exhaust gas enthalpy are used to increase significantly furnace efficiency and productivity without increasing $NO_X$ production due to the structure and method of use of furnace 10.

It is known that in order to enhance flame radiation, a high concentration of combustion products—primarily $CO_2$, $H_2O$, and some soot—is required. Therefore, the present invention employs some or all of the following: a slightly rich combustion mixture; oxygen-enriched combustion air to increases the $CO_2$ and $H_2O$ concentrations and reduces the $N_2$ concentration; existing combustion products (exhaust gas recirculation) to substantially dilute the fuel/air mixture to increase radiation, reduce peak flame temperatures, and thermal NO production.

Slightly rich combustion, in addition to increasing the flame radiation, will also enable reburn reactions to further reduce NO concentration. An additional advantage of slightly rich combustion in reaction zone 26 is that any oxygen in furnace 10 will be consumed, thereby producing an oxygen-free atmosphere. This prevents oxidation of materials being heated and dross formation—providing considerable savings in the minimizing or eliminating wasted material. The second stage combustion air injection also helps complete the combustion of exhaust gases and the enthalpy is use to preheat the incoming fuel and combustion air.

The preheating of the combustion air within the plurality of air distribution lines 40 (above the auto ignition temperature>1300K) and the substantial dilution of the combustion air when injected and mixed with existing combustion products within reaction zone 26 (exhaust gas recirculation (EGR)) reduces the oxygen concentration of the combustion mixture within reaction zone 26. Therefore, the burning within reaction zone 26 occurs in a mode known as Flameless Oxidation (FLOX) and, hence, prevents occurrence of locally high flame temperatures. As mentioned above, locally high flame temperatures are known to lead to increased $NO_X$ production. The present invention thus provides combustion stability and radiation uniformity due to the mixing of the combustion air, fuel, and existing combustion products, which leads to a uniform heating layer generally extending through the volume of reaction zone 26.

To fully utilize the benefits of flame radiation, it is essential to have a substantial volume of hot combustion products. More particularly, radiation is roughly proportional to the flame volume (i.e. in this case, reaction zone 26) until unity emissivity is reached. Therefore, it is advantageous to have evenly distributed combustion throughout the volume of reaction zone 26 to provide uniform radiation. The configuration of the present invention, namely the trapping and mixing of existing combustion products with combustion air and fuel injected separately from internal ceiling member 22, helps accomplish these goals by accumulating the exhaust gases and mixing them with the incoming combustion air and fuel prior to reacting. The layer depth A of reaction zone 26 and the fuel and combustion air jet velocities and locations are all adjusted to maximize radiation heat flux and minimize pollutant production.

Figure 2:
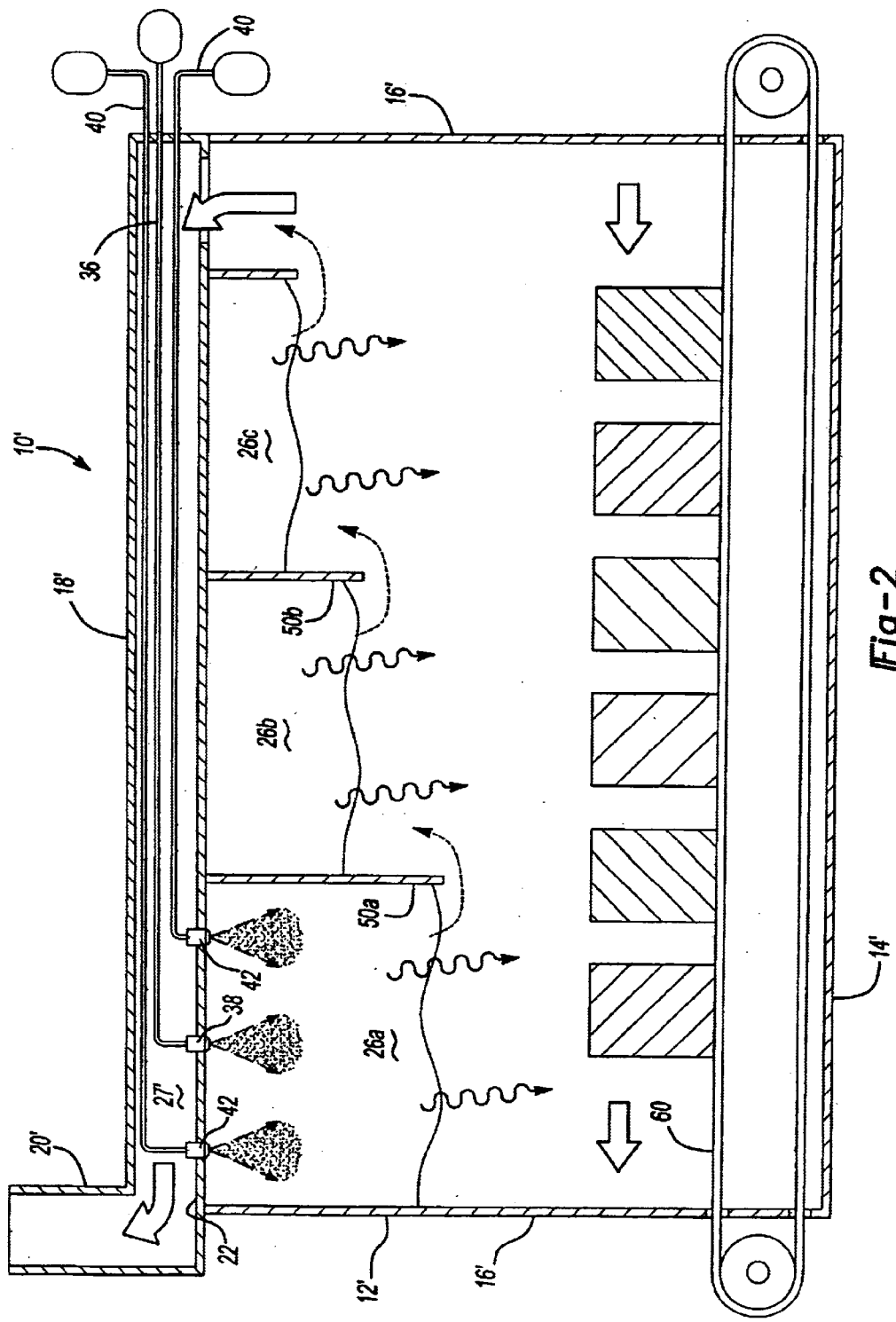
FIG. 2 is a schematic view illustrating a furnace according to a second embodiment of the present invention.

With brief reference to FIG. 2, a second embodiment of the present invention is illustrated having multiple reaction zones 26'. Specifically, a furnace 10' generally comprises a furnace housing 12' defining a bottom section 14', a side wall(s) 16', and a top section 18'. Bottom section 14', sidewalls 16', and top section 18' are preferably insulated according to known techniques. Furnace housing 12' further includes an exhaust stack 20' preferably extending from top section 18' to allow the exhausting of combusted materials. An internal ceiling member 22' is disposed within furnace housing 12' generally parallel to and offset from top section 18'. This offset spacing between internal ceiling member 22' and top section 18' define an exhaust passage 27' extending from a plurality of reaction zones 26' to exhaust stack 20'. More specifically, furnace 10' includes a plurality of weir walls 50 vertically extending from ceiling member 22' to catch and retain a predetermined amount of combustion products before allowing the combustion products to flow to exhaust stack 20'. The plurality of weir walls 50 are used to trap combustion products as they "spill over" from adjacent reaction zones 26'. That is, during operating, air and fuel are mixed with existing combustion products according to the process described above in a first reaction zone 26a. As these combustion products form to define a combustion layer, they will remain in first reaction zone 26a until the combustion layer depth exceeds the length of weir wall 50a. At that point, combustion products will spill over into second reaction zone 26b, until again the combustion layer depth exceeds the length of weir wall 50b. This process may continue for any number of reaction zones.

It should be appreciate from FIG. 2 and the foregoing discussion that the plurality of weir walls 50 may be different lengths, which will produce differing depths of reaction zones. For example, if weir wall 50b is shorter than weir wall 50a (as illustrated in FIG. 2), reaction zone 26b have less volume than reaction zone 26a, thereby providing less radiation. Accordingly, if the articles to be heated are disposed on a conveyor 60 and moved (from right to left in FIG. 2), the articles will be gradually heated, first by a reaction zone 26c, then reaction zone 26b, and finally by reaction zone 26a. As can be appreciated, a larger number of reaction zones should provide more gradual heating of the articles. The combustion products finally spill over the final weir wall (in this case 50c) and into exhaust passage 27', which will then preheat the air and fuel as described above. While not shown in FIG. 2, the slightly rich combustion products are also burned in the exhaust passage 27' in a manner similar to that described for furnace 10. Also, as described for furnace 10, due to the exposed slightly rich combusting ceiling layers, an oxygen-free atmosphere is maintained in the furnace preventing oxidation of the articles being heated.

Additionally, the configurations of the present invention enables burning of low calorific value fuels and VOCs that must be incinerated separately in many industries. This multi-fuel capability is helpful to minimize adverse effects of price fluctuations.

The furnace designs schematically shown in FIGS. 1 and 2 utilize the above principles to dramatically increase the energy efficiency of furnace 10 or 10' to strictly maintain acceptable levels of $NO_X$, CO, total unburned hydrocarbons (THC), and particulate emissions. The present invention provides for generally homogeneous burning (distributed reaction zone) under slightly rich conditions in the reaction zone, thereby forming a hot layer of intensely radiating combustion products. The combustion products eventually spill out into co-annular exhaust ducts where a second-stage combustion air injection completes the combustion and efficiently transfers the heat to the incoming fresh fuel and combustion air through a heat transfer process. The highly preheated oxygen-enriched combustion air and fuel are injected separately into the combustion layer A to enable mixing with the existing combustion products prior to burning. This dilution by combustion products ensures homogeneous burning with low peak flame temperatures and produces a nearly homogeneously distributed reaction zone. Thus, the present invention provides nearly uniform radiation heat transfer to the objects in the furnace at a magnitude exceeding 400 kW/m2—a level that is nearly twice the current maximum, thereby enabling an increase in the furnace productivity or a decrease in size and cost. The present invention is able to achieve near unity emissivity at an average hot layer temperature of about 1700K with peak temperatures not exceeding 1800K to prevent formation of thermal (Zeldovich) NO. The use of oxygen-enriched combustion air, while not essential, helps in increasing the $CO_2$ percentage and $H_2O$ percentage and reducing the $N_2$ percentage in the hot layer. Since low peak flame temperatures are maintained, NO is formed primarily by the prompt mechanism and, thus, its rate of production is proportional to the percentage of $N_2$ in the hot layer. Furthermore, slightly rich conditions in the hot layer promote NO reburn. Hence, very low NO concentration exists in the exhaust.

Additional advantages of the present invention includes: (I) an oxygen-free atmosphere that is maintained within the furnace, which prevents scale formation and subsequent material loss due to oxidation; (II) low heating value gases can be burned in the reaction zone due to the high temperatures; (III) volatile organic compounds (VOCs), produced by other processes, can be directly burned in the reaction zone, thus avoiding or at least minimizing the need of auxiliary incinerators; and (IV) the reaction zone temperature and, hence, the furnace heat flux is limited only by $NO_X$ formation and the furnace construction materials. Thus, very high temperatures, required for processing materials such as titanium, can be easily obtained by using pure oxygen (hence no $NO_X$) and appropriate construction materials. In the presence of $N_2$, the current maximum operation point is near unity hot layer emissivity at an average temperature of about 1700K with peak temperatures, and not exceeding 1800K to prevent formation of thermal (Zeldovich) NO. (V) Lastly, the furnace is expected to require little maintenance.

In order to start the furnace of the present invention from cold, reaction zone 26 is first filled with combustion air through the plurality of air distribution lines 40 and air nozzles 42. Next, fuel is introduced via the plurality of fuel distribution lines 36 and fuel nozzles 38 and ignited by a pilot flame. The plurality of air distribution lines 40 may be switched to oxygen-enriched combustion air, if desired. This is done such that as the combustion product concentration in reaction zone 26 builds up, the oxygen concentration is depleted and the gases are thus not yet hot enough to burn in a low oxygen concentration atmosphere. The layer of the combustible mixture slowly deepens until it spills into co-annular exhaust ducts 24, where it is combusted in the second stage combustion process. The heat generated in this process is then used to preheat the incoming fuel and combustion air, which leads to a steady state.

Radiation detectors (not shown) may be used to control the richness of reaction zone 26 to maximize the radiation output. Turndown of furnace 10 can be accomplished simply by turning down the inlet fuel flow rate and the corresponding oxygen-enriched airflow rate. The oxygen-enrichment of the combustion air can also be turned down to reduce expense.

The furnace of the present invention may be used in a wide range of energy-intensive metal processing (melting, reheating, heat-treating, etc.) industries like Steel, Metal Casting, Aluminum, Glass, Chemicals, and Paper. While it is most suited for natural gas, other liquid fuels can also be utilized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A furnace apparatus comprising:
    a housing;
    a combustion chamber disposed within said housing, said combustion chamber having a pilot flame;
    a fuel inlet passage in fluid communication with said combustion chamber, said fuel inlet passage being operable to selectively inject a fuel within said combustion chamber;
    an air inlet passage in fluid communication with said combustion chamber, said air inlet passage being separate and spaced apart from said fuel inlet passage, said air inlet passage being operable to selectively inject air within said combustion chamber,
    wherein during steady state said fuel and said air fluidly mix with existing combustion products within said combustion chamber prior to combustion to produce a generally homogeneous mixture within a reaction zone to promote generally uniform radiation transfer; and
    an exhaust passage in fluid communication with said combustion chamber, said exhaust passage being positioned so as to maintain a predetermined thickness of said reaction zone.

2. The furnace apparatus according to claim 1, further comprising:
    an intermediate member disposed generally horizontally along an upper portion of said combustion chamber, said fuel inlet passage and said air inlet passage being coupled to said intermediate member and directed downwardly.

3. The furnace apparatus according to claim 1 wherein said fuel inlet passage and said air inlet passage are disposed within said exhaust passage so as to promote preheating of said fuel and said air prior to injection into said combustion chamber.

4. The furnace apparatus according to claim 1 wherein said fuel inlet passage and said air inlet passage are directed so as to promote generally uniform flow mixing within said reaction zone.

5. The furnace apparatus according to claim 1, further comprising:
    a secondary air inlet passage in fluid communication with said exhaust passage, said secondary air inlet passage being operable to selectively inject air within said exhaust passage to promote secondary combustion.

6. The furnace apparatus according to claim 1 wherein during steady state said reaction zone is free of oxygen.

7. The furnace apparatus according to claim 1 wherein steady state combustion within said reaction zone produces radiation generally greater than 250 kW/m$^2$.

8. The furnace apparatus according to claim 7 wherein steady state combustion within said reaction zone produces radiation generally greater than 400 kW/m$^2$.

9. A furnace apparatus comprising:
    a housing;
    a combustion chamber disposed within said housing, said combustion chamber having a pilot flame;
    a fuel inlet passage in fluid communication with said combustion chamber, said fuel inlet passage being operable to selectively inject a fuel within said combustion chamber;

an air inlet passage in fluid communication with said combustion chamber said air inlet passage being separate and spaced apart from said fuel inlet passage, said air inlet passage being operable to selectively inject air within said combustion chamber, wherein during steady state said fuel and said air fluidly mix with existing combustion products within said combustion chamber prior to combustion to produce a generally homogeneous mixture within said combustion chamber to promote generally uniform radiation transfer, further comprising: an intermediate member disposed generally horizontally along an upper portion of said combustion chamber, said fuel inlet passage and said air inlet passage being coupled to said intermediate member and directed downwardly; an exhaust passage; an exhaust port extending between said combustion chamber and said exhaust passage to establish fluid communication between said combustion chamber and said exhaust passage, said exhaust port being spaced below said intermediate member to define a reaction zone, wherein said fuel inlet passage and said air inlet passage are disposed within said exhaust passage so as to promote preheating of said fuel and said air prior to injection into said combustion chamber, wherein said fuel and said air are preheated to a temperature greater than their respective autoignition temperature.

10. A furnace apparatus comprising:

a housing;

a combustion chamber disposed within said housing, said combustion chamber having a pilot flame;

a fuel inlet passage in fluid communication with said combustion chamber, said fuel inlet passage being operable to selectively inject a fuel within said combustion chamber;

an air inlet passage in fluid communication with said combustion chamber, said air inlet passage being separate and spaced apart from said fuel inlet passage, said air inlet passage being operable to selectively inject air within said combustion chamber, wherein during steady state said fuel and said air fluidly mix with existing combustion products within said combustion chamber prior to combustion to produce a generally homogeneous mixture within said combustion chamber to promote generally uniform radiation transfer;

an intermediate member disposed generally horizontally along an upper portion of said combustion chamber, said fuel inlet passage and said air inlet passage being coupled to said intermediate member and directed downwardly;

a first weir wall extending from said intermediate member a first length; and a second weir wall extending from said intermediate member, said second wall have a second length.

11. The furnace apparatus according to claim 10 wherein said second length is shorter than said first length.

12. A furnace apparatus comprising:

a housing having a top section, a bottom section, and at least one side wall interconnecting said top section, and said bottom section to define a volume;

an intermediate member disposed along an upper portion of said volume;

a fuel inlet passage coupled to said intermediate member and directed generally downwardly, said fuel inlet passage being operable to selectively inject a fuel within said volume; and an air inlet passage fluidly coupled to said intermediate member and directed generally downwardly, said air inlet passage being separate and spaced apart from said fuel inlet passage, said air inlet passage being operable to selectively inject air within said volume, said fuel and said air mixing to define a reaction zone upon exposure to ignition; and an exhaust passage in fluid communication with said volume, said exhaust passage being positioned so as to maintain a predetermined thickness of said reaction zone.

13. The furnace apparatus according to claim 12 wherein said intermediate member is disposed generally horizontally along an upper portion of said volume.

14. The furnace apparatus according to claim 12 wherein said fuel inlet passage and said air inlet passage are disposed within said exhaust passage so as to promote preheating of said fuel and said air prior to injection into said volume.

15. A furnace apparatus comprising:

a housing having a top section, a bottom section, and at least one side wall interconnecting said top section and said bottom section to define a volume;

an intermediate member disposed along an upper portion of said volume;

a fuel inlet passage coupled to said intermediate member and directed generally downwardly, said fuel inlet passage being operable to selectively inject a fuel within said volume; and an air inlet passage fluidly coupled to said intermediate member and directed generally downwardly, said air inlet passage being separate and spaced wart from said fuel inlet passage, said air inlet passage being operable to selectively inject air within said volume, further comprising: an exhaust passage; an exhaust port extending between said volume and said exhaust passage to establish fluid communication between said volume and said exhaust passage, said exhaust port being spaced below said intermediate member to define a reaction zone, wherein said fuel inlet passage and said air inlet passage are disposed within said exhaust passage so as to promote preheating of said fuel and said air prior to injection into said volume, wherein said fuel and said air are preheated to a temperature greater than their respective autoignition temperature.

16. The furnace apparatus according to claim 12 wherein said fuel inlet passage and said air inlet passage are directed so as to promote generally uniform flow mixing within said reaction zone.

17. The furnace apparatus according to claim 12 further comprising:

a secondary air inlet passage in fluid communication with said exhaust passage, said secondary air inlet passage being operable to selectively inject air within said exhaust passage to promote secondary combustion.

18. The furnace apparatus according to claim 12 wherein during steady state said reaction zone is free of oxygen.

19. The furnace apparatus according to claim 12 wherein steady state combustion within said reaction zone produces radiation generally greater than 250 kW/m$^2$.

20. The furnace apparatus according to claim 19 wherein steady state combustion within said reaction zone produces radiation generally greater than 400 kW/m$^2$.

21. A furnace apparatus comprising:
  a housing having a top section, a bottom section, and at least one side wall interconnecting said top section and said bottom section to define a volume;
  an intermediate member disposed along an upper portion of said volume;
  a fuel inlet passage coupled to said intermediate member and directed generally downwardly, said fuel inlet passage being operable to selectively inject a fuel within said volume;
  an air inlet passage fluidly coupled to said intermediate member and directed generally downwardly, said air inlet passage being separate and spaced wart from said fuel inlet passage, said air inlet passage being operable to selectively inject air within said volume;
  a first weir wall extending from said intermediate member a first length; and
  a second weir wall extending from said intermediate member, said second wall have a second length.

22. The furnace apparatus according to claim 21 wherein said second length is shorter than said first length.

23. A furnace apparatus comprising:
  a housing having a top section, a bottom section, and at least one side wall interconnecting said top section and said bottom section to define a volume;
  an intermediate member disposed generally horizontally along an upper portion of said volume, said intermediate member being offset from said top section;
  an exhaust passage disposed along at least a portion of said side wall, between said top section and said intermediate member, and out an exhaust stack;
  an exhaust port extending between said volume and said exhaust passage to establish fluid communication between said volume and said exhaust passage, said exhaust port being spaced below said intermediate member to define a reaction zone;
  a fuel inlet passage coupled to said intermediate member and directed generally downwardly, said fuel inlet passage being operable to selectively inject a fuel within said reaction zone; and
  an air inlet passage fluidly coupled to said intermediate member and directed generally downwardly, said air inlet passage being separate and spaced apart from said fuel inlet passage, said air inlet passage being operable to selectively inject air within said reaction zone.

24. The furnace apparatus according to claim 23 wherein said fuel inlet passage and said air inlet passage extend within said exhaust passage so as to promote preheating of said fuel and said air prior to injection into said volume.

25. The furnace apparatus according to claim 24 wherein said fuel and said air are preheated to a temperature greater than their respective autoignition temperature.

26. The furnace apparatus according to claim 23 wherein said fuel inlet passage and said air inlet passage are directed so as to promote generally uniform flow mixing within said reaction zone.

27. The furnace apparatus according to claim 23, further comprising:
  a secondary air inlet passage in fluid communication with said exhaust passage, said secondary air inlet passage being operable to selectively inject air within said exhaust passage to promote secondary combustion.

28. The furnace apparatus according to claim 23 wherein during steady state said reaction zone is free of oxygen.

29. The furnace apparatus according to claim 23 wherein steady state combustion within said reaction zone produces radiation generally greater than 250 kW/m$^2$.

30. The furnace apparatus according to claim 29 wherein steady state combustion within said reaction zone produces radiation generally greater than 400 kW/m$^2$.

31. The furnace apparatus according to claim 23, further comprising:
  a first weir wall extending from said intermediate member a first length; and
  a second weir wall extending from said intermediate member, said second wall have a second length.

32. The furnace apparatus according to claim 31 wherein said second length is shorter than said first length.

33. A method of using a furnace comprising:
  providing a housing having a ceiling and defining a first volume;
  separately injecting combustion air and fuel into said first volume;
  mixing said combustion air and said fuel with existing combustion products within said first volume; and
  igniting said mixture of said combustion air, said fuel, and said existing combustion products to define a first reaction zone; and
  exhausting combustion products through an exhaust passage once a predetermined thickness of said first reaction zone is achieved.

34. The method according to claim 33, further comprising:
  permitting said combustion products to flow to a second volume, said second volume defining a second reaction zone.

35. The method according to claim 34 wherein said second reaction zone defines a volume that is smaller than a volume of said first reaction zone.

36. The method according to claim 33 wherein said first reaction zone is generally oxygen free during steady state operation.

37. The method according to claim 33, further comprising:
  injecting combustion air into said exhaust passage to promote secondary combustion of said combustion products.

38. The method according to claim 33, further comprising:
  preheating said combustion air and said fuel prior to injecting into said first volume.

39. The method according to claim 33 wherein steady state combustion within said first reaction zone produces radiation generally greater than 250 kW/m$^2$.

40. The method according to claim 33 wherein steady state combustion within said first reaction zone produces radiation generally greater than 400 kW/m$^2$.

* * * * *

UNITED STATES PATENT AND TRADEMARK OFFICE
CERTIFICATE OF CORRECTION

PATENT NO. : 6,764,304 B2
DATED : July 20, 2004
INVENTOR(S) : Arvind Atreya

It is certified that error appears in the above-identified patent and that said Letters Patent is hereby corrected as shown below:

Column 10,
Line 34, "wart" should be -- apart --.

Column 11,
Line 13, "wart" should be -- apart --.

Signed and Sealed this

Ninth Day of August, 2005

JON W. DUDAS
*Director of the United States Patent and Trademark Office*